United States Patent
Morikawa et al.

(10) Patent No.: US 10,316,249 B2
(45) Date of Patent: Jun. 11, 2019

(54) METHOD FOR PRODUCING BETA-SIALON FLUORESCENT MATERIAL

(71) Applicant: NICHIA CORPORATION, Anan-shi, Tokushima (JP)

(72) Inventors: Motoharu Morikawa, Anan (JP); Kenichi Aoyagi, Tokushima (JP); Takashi Kaide, Anan (JP); Shoji Hosokawa, Tokushima (JP)

(73) Assignee: NICHIA CORPORATION, Anan-shi (JP)

( * ) Notice: Subject to any disclaimer, the term of this patent is extended or adjusted under 35 U.S.C. 154(b) by 316 days.

(21) Appl. No.: 15/165,580

(22) Filed: May 26, 2016

(65) Prior Publication Data

US 2016/0347999 A1 Dec. 1, 2016

(30) Foreign Application Priority Data

May 29, 2015 (JP) ................................ 2015-109991
Apr. 26, 2016 (JP) ................................ 2016-087988

(51) Int. Cl.
*C09K 11/77* (2006.01)

(52) U.S. Cl.
CPC ................................ *C09K 11/7734* (2013.01)

(58) Field of Classification Search
CPC ............................................... C09K 11/7734
See application file for complete search history.

(56) References Cited

U.S. PATENT DOCUMENTS

| 2007/0108896 | A1 | 5/2007 | Hirosaki | |
|---|---|---|---|---|
| 2009/0050845 | A1* | 2/2009 | Hirosaki | C09K 11/0883 252/301.4 F |
| 2010/0219741 | A1* | 9/2010 | Kawasaki | C09K 11/0883 313/483 |
| 2012/0305844 | A1* | 12/2012 | Emoto | C09K 11/0883 252/301.4 F |
| 2012/0313507 | A1* | 12/2012 | Hashimoto | C04B 35/597 313/503 |
| 2013/0093314 | A1* | 4/2013 | Takeda | C09K 11/7734 313/503 |

FOREIGN PATENT DOCUMENTS

| JP | 2005-255895 A | 9/2005 |
|---|---|---|
| JP | 2007-326981 A | 12/2007 |
| JP | 2011-174015 A | 9/2011 |
| JP | 2013-173868 A | 9/2013 |

OTHER PUBLICATIONS

May 15, 2018—Non-Final Office Action in U.S. Appl. No. 15/228,109 (Year: 2018).*

* cited by examiner

*Primary Examiner* — Robert J Grun
(74) *Attorney, Agent, or Firm* — Hunton Andrews Kurth LLP (57) ABSTRACT

A method for producing a β-sialon fluorescent material superior in light emitting luminance is provided. The method includes heat-treating a first mixture containing an aluminum compound, a europium compound, and a first silicon oxynitride compound to obtain a first heat-treated product, and heat-treating a second mixture containing the first heat-treated product, an aluminum compound, a europium compound, and a second silicon oxynitride compound, which has a larger oxygen content than the first silicon oxynitride compound, to obtain a second heat-treated product.

10 Claims, 3 Drawing Sheets

METHOD FOR PRODUCING BETA-SIALON
FLUORESCENT MATERIAL

CROSS-REFERENCE TO RELATED
APPLICATION

This application claims priority to Japanese Patent Application No. 2015-109991, filed on May 29, 2015 and Japanese Patent Application No. 2016-087988, filed on Apr. 26, 2016, the entire disclosures of which are incorporated herein by reference.

BACKGROUND OF THE INVENTION

Field of the Invention

The present disclosure relates to a method for producing a β-sialon fluorescent material.

Description of the Related Art

Light emitting devices that emit light of various hues owing to the principle of the mixture of colors of light are being developed. Such a light emitting device includes a light source and a wavelength conversion member to be used in combination with the light source. The wavelength conversion member is configured to emit light with hues different from the hue of the light source when excited by the light from the light source.

In particular, light emitting devices composed of a light emitting diode ("LED") combined with a fluorescent material are increasingly and widely utilized, for example, as backlights for liquid crystal displays or as lighting systems. When a light emitting device incorporates a plurality of fluorescent materials, a fluorescent material that emits light at short wavelengths, such as blue-green, green, and yellow-green, and a fluorescent material that emits light at long wavelengths, such as orange and red, may be combined, for example, to allow liquid crystal displays to have an improved color reproduction range and lighting systems to have an improved color rendering.

As examples of such fluorescent materials, aluminate fluorescent materials, silicate fluorescent materials, sulfide fluorescent materials, phosphate fluorescent materials, and borate fluorescent materials are known. As a replacement of these fluorescent materials, fluorescent materials that have a nitrogen-containing inorganic crystal as a host crystal in the crystalline structure, such as sialon fluorescent materials, oxynitride fluorescent materials, and nitride fluorescent materials, have been proposed. Such fluorescent materials exhibit small luminance decrease associated with temperature increase and have superior durability. A representative example of such fluorescent materials is sialon, which is a solid solution of silicon nitride. α-type sialon fluorescent materials and β-type sialon fluorescent materials, which have different crystalline systems from each other, are attracting attention. In particular, β-type sialon fluorescent materials (hereinafter also referred to as "β-sialon fluorescent materials") are highly efficient, green fluorescent materials that are excited in a wide wavelength range of from near-ultraviolet light to blue light, and have a peak light emission wavelength in the range of 520 to 550 nm.

β-sialon fluorescent materials are, for instance, represented by a compositional formula: $Si_{6-z}Al_zO_zN_{8-z}$:Eu ($0<z\leq4.2$). A β-sialon fluorescent material may be obtained as a sintered product, for example, by mixing silicon nitride ($Si_3N_4$), aluminum nitride (AlN), and aluminum oxide ($Al_2O_3$) with europium oxide ($Eu_2O_3$), which serves as an activator, in a predetermined molar ratio, and sintering the mixture at around 2000° C. It has been described that heat-treating the sintered product in an inert gas, and acid-treating the resultant product will produce a β-sialon fluorescent material with high luminance (see, for example, JP 2005-255895 A and JP 2011-174015 A). A method of performing heating treatment separately twice at a high temperature to further improve the properties of the β-sialon fluorescent material to be obtained, and also a method of using, as a part of raw materials, a β-sialon fluorescent material obtained by sintering to enhance the luminance are known (see, for example, JP 2007-326981 A and JP 2013-173868 A).

SUMMARY OF INVENTION

A method for producing a β-sialon fluorescent material superior in light emitting luminance is provided. The method includes heat-treating a first mixture containing an aluminum compound, a europium compound, and a first silicon oxynitride compound to obtain a first heat-treated product and heat-treating a second mixture containing the first heat-treated product, an aluminum compound, a europium compound, and a second silicon oxynitride compound, which has an oxygen content larger than an oxygen content in the first silicon oxynitride compound, to obtain a second heat-treated product.

DETAILED DESCRIPTION OF THE
EMBODIMENT

There has been a demand for still further improvement in luminance of β-sialon fluorescent materials in a practical aspect. Hence, an object according to an embodiment of this disclosure is to provide a method for producing a β-sialon fluorescent material superior in light emitting luminance.

In view of the problem, the inventors found, as a result of intensive study, that controlling the amount of oxygen by combining, as a material, silicon oxynitride containing much oxygen and silicon oxynitride containing less oxygen enables control of, for example, the size and shape of the β-sialon fluorescent material particles to be obtained, leading to higher luminance. The inventors thus accomplished the present invention. That is, the present disclosure includes the following embodiments.

A method for producing a β-sialon fluorescent material is provided. The method includes heat-treating a first mixture containing an aluminum compound, a europium compound, and a first silicon oxynitride compound to obtain a first heat-treated product, and heat-treating a second mixture containing the first heat-treated product, an aluminum compound, a europium compound, and a second silicon oxynitride compound, which has a larger oxygen content than the first silicon oxynitride compound, to obtain a second heat-treated product.

According to an embodiment of the present disclosure, a method for producing a β-sialon fluorescent material superior in light emitting luminance can be provided.

A method for producing a β-sialon fluorescent material according to the present disclosure will be described below with reference to embodiments. The embodiments shown below, however, are mere examples of the production method, for example, for embodying the technical concept of the present invention, and the method for producing a β-sialon fluorescent material of the present invention is not limited to the following embodiments.

The relationship between the color names and the chromaticity coordinates, the relationship between the wavelength ranges of light and the color names of monochromatic light, and others are in accordance with Japanese Industrial Standard (JIS) Z8110. Specifically, light in the range of 380 nm to 410 nm is violet, light in the range of 410 nm to 455 nm is blue-violet, light in the range of 455 nm to 485 nm is blue, light in the range of 485 nm to 495 nm is blue-green, light in the range of 495 nm to 548 nm is green, light in the range of 548 nm to 573 nm is yellow-green, light in the range of 573 nm to 584 nm is yellow, light in the range of 584 nm to 610 nm is yellow-red, and light in the range of 610 nm to 780 nm is red.

As used herein, the term "step" means not only an independent step but also a step which cannot be clearly distinguished from the other steps but can achieve the anticipated effect of that step. Further, for the amount of each component contained in a composition, when a plurality of substances corresponding to the component exist, the amount of the component means the total amount of the substances present in the composition unless otherwise specified.

The mean particle diameter is a volume median diameter (Dm), which is measured by a pore electrical resistance method (Electrical sensing zone method) based on the Coulter principle. Specifically, a particle size distribution is measured using a particle size distribution measuring device (e.g., Multisizer manufactured by Beckman Coulter), and a volume median diameter (Dm) is obtained as a particle diameter corresponding to a cumulative volume of 50% from a minor diameter side of the particle.

Method for producing a β-sialon fluorescent material

The method for producing a β-sialon fluorescent material of the present embodiment includes heat-treating a first mixture containing an aluminum compound, a europium compound, and a first silicon oxynitride compound to obtain a first heat-treated product (hereinafter referred to as "a first heat treatment step"), and heat-treating a second mixture containing the first heat-treated product, an aluminum compound, a europium compound, and a second silicon oxynitride compound, which has a larger oxygen content than the first silicon oxynitride compound, to obtain a second heat-treated product (hereinafter referred to as "a second heat treatment step"). The β-sialon fluorescent material preferably has a composition represented by formula (I):

$$Si_{6-z}Al_zO_zN_{8-z}:Eu \quad (I)$$

In the formula (I), z satisfies $0.0 < z \leq 4.2$.

Using silicon oxynitride compounds having oxygen contents different from each other, and performing heat treatment at least twice enables efficient production of a β-sialon fluorescent material superior in light emitting luminance to β-sialon fluorescent materials obtained by conventional production methods. Furthermore, a β-sialon fluorescent material obtained by the production method of the present embodiment is likely to have a larger particle diameter and superior crystallinity.

The first heat-treated product obtained by the first heat treatment step itself contains a β-sialon fluorescent material and has light emitting luminance of a level achieved by conventional production methods. The present embodiment enables production of a β-sialon fluorescent material having superior light emitting luminance that cannot be achieved by conventional production methods, by subjecting a second mixture, which contains a first heat-treated product, to a second heat treatment step.

In the first heat treatment step, a first mixture containing an aluminum compound, a europium compound, and a first silicon oxynitride compound is heat-treated to obtain a first heat-treated product.

The first mixture contains at least an aluminum compound, at least a europium compound, and at least a first silicon oxynitride compound.

Examples of the aluminum compound include aluminum-containing oxide, hydroxide, nitride, oxynitride, fluoride, and chloride. In place of at least a portion of the aluminum compound, a simple aluminum metal or an aluminum alloy may be used. Specific examples of the aluminum compound include aluminum nitride (AlN), aluminum oxide ($Al_2O_3$), and aluminum hydroxide ($Al(OH)_3$). Preferably, at least one selected from the group consisting of aluminum nitride (AlN), aluminum oxide ($Al_2O_3$), and aluminum hydroxide ($Al(OH)_3$) is used. These aluminum compounds may be used alone or in combination.

The mean particle diameter of the aluminum compound to be used as a raw material is, for instance, from 0.01 μm to 20 μm, and preferably from 0.1 μm to 10 μm. The purity of the aluminum compound is, for instance, 95% by weight or more, and preferably 99% by weight or more.

Examples of the europium compound include europium-containing oxide, hydroxide, nitride, oxynitride, fluoride, and chloride. In place of at least a portion of the europium compound, a simple europium metal or a europium alloy may be used. Specific examples of the europium compound contain europium oxide ($Eu_2O_3$), europium nitride (EuN), and europium fluoride ($EuF_3$). Preferably, at least one selected from the group consisting of europium oxide ($Eu_2O_3$), europium nitride (EuN), and europium fluoride ($EuF_3$) is used. These europium compounds may be used alone or in combination.

The mean particle diameter of the europium compound to be used as a raw material is, for instance, from 0.01 μm to 20 μm, and is preferably from 0.1 μm to 10 μm. The purity of the europium compound is, for instance, 95% by weight or more, and preferably 99.5% by weight or more.

The first silicon oxynitride compound is a silicon compound containing an oxygen atom, a nitrogen atom, and a silicon atom. Preferably, the first silicon oxynitride compound is a silicon nitride containing an oxygen atom. The oxygen atom may be contained in the form of silicon oxide, or in the form of an oxynitride of silicon.

The content of the oxygen atom contained in the first silicon oxynitride compound is, for instance, less than 0.8% by weight, and preferably 0.7% by weight or less. The content of the oxygen atom is also, for instance, 0.3% by weight or more, and preferably 0.4% by weight or more.

The specific surface area of the first silicon oxynitride compound obtained by the Brunauer-Emmett-Teller (BET) method is, for instance, from 0.5 m²/g to 12 m²/g, and is preferably from 3 m²/g to 10 m²/g. When the specific surface area of the first silicon oxynitride compound falls within this range, a β-sialon fluorescent material superior in light emitting luminance is likely to be obtained.

The mean particle diameter of the first silicon oxynitride compound is, for instance, from 0.01 μm to 15 μm, and is preferably from 0.1 μm to 5 μm. The mean particle diameter is correlated with, for instance, the specific surface area, and the larger the specific surface area, the smaller the mean particle diameter is likely to be.

The mixing ratio of the aluminum compound, the europium compound, and the first silicon oxynitride compound in the first mixture is not particularly limited as long as a β-sialon fluorescent material is obtained, and may be selected as appropriate depending on the desired composition. For instance, the molar ratio of silicon atom to aluminum atom contained in the first mixture is $(6-z):z$ $(0.0<z\leq4.2)$, and preferably $0.01<z<1$. The molar ratio of the combined molar quantity of silicon atom and aluminum atom to the molar quantity of europium atom is, for instance, 6:0.001 to 6:0.05, and preferably 6:0.003 to 6:0.02.

The first mixture may contain a flux, such as halide. By a flux being contained in the first mixture, the reaction among the raw materials in the first mixture is further promoted, and a more uniform solid-phase reaction is facilitated, resulting in a fluorescent material having a large particle diameter and superior light emission properties. This is believed to be attributable, for instance, to the fact that the temperature of the heat treatment in the production method is equal to or greater than the temperature of the formation of the liquid phase including halide, which is a flux. Examples of halides usable include rare-earth metals, alkaline-earth metals, and chlorides or fluorides of alkali metals. The flux may be added as a compound that helps the element ratio of the cations to achieve the target composition, or may be further added as an additive after various materials are added to make up the target composition.

When the first mixture contains a flux, the content of the flux in the first mixture is, for instance, 20% by mass or less, and preferably 10% by mass or less. The content of the flux is also, for instance, 0.1% by mass or more.

The first mixture may be obtained by weighing desired raw materials in a desired compounding ratio, and then mixing the raw materials by a mixing method using a ball mill, or a mixing method using a mixing machine, such as a Henschel mixer or a V-blender, or using a mortar and a pestle. The mixing may be dry mixing or wet mixing by adding, for instance, a solvent.

In the first heat treatment step, the first mixture is heat-treated to obtain a first heat-treated product. The temperature of the first heat treatment is preferably from 1850° C. to 2100° C., more preferably from 1900° C. to 2050° C., still more preferably from 1920° C. to 2050° C., and particularly preferably from 2000° C. to 2050° C. Heat-treatment at a temperature of 1850° C. or more enables efficient formation of β-sialon, and easier incorporation of Eu into the crystal, resulting in a desired β-sialon fluorescent material. Heat treatment at a temperature of 2100° C. or less is likely to suppress degradation of the resulting β-sialon fluorescent material.

The atmosphere of the first heat treatment step is not particularly limited as long as the desired β-sialon fluorescent material is obtained. The atmosphere of the first heat treatment step is preferably a nitrogen gas-containing atmosphere, and, more preferably, is essentially a nitrogen gas atmosphere. When the atmosphere of the first heat treatment step contains a nitrogen gas, the atmosphere may contain hydrogen, oxygen, or another gas, such as ammonia, in addition to the nitrogen gas. The content of the nitrogen gas in the atmosphere of the first heat treatment step is, for instance, 90% by volume or more, and preferably 95% by volume or more.

The pressure in the first heat treatment step may be, for instance, ordinary pressure to 200 MPa. To suppress degradation of the β-sialon fluorescent material to be generated, the pressure is preferably high, preferably from 0.1 MPa to 200 MPa, and more preferably from 0.6 MPa to 1.2 MPa, because the above described range imposes less restriction on industrial equipment.

In the first heat treatment step, the heat treatment is performed, for instance, by elevating the temperature from room temperature to a predetermined temperature. The time required for elevating the temperature is, for instance, from 1 hour to 48 hours, preferably from 2 hours to 24 hours, and more preferably from 3 hours to 20 hours. When the time for elevating the temperature is 1 hour or more, the growth of the fluorescent material particles is likely to fully proceed, and Eu is likely to be easily incorporated into the crystal of the fluorescent material particles.

The retention time at a predetermined temperature in the first heat treatment step is, for instance, from 1 hour to 48 hours, preferably from 2 hours to 30 hours, and more preferably from 3 hours to 20 hours.

The time for lowering the temperature from a predetermined temperature to room temperature in the first heat treatment step is, for instance, from 0.1 hour to 20 hours, preferably from 1 hour to 15 hours, and more preferably from 3 hours to 12 hours.

The first heat treatment step may be performed, for instance, by putting the first mixture into a boron nitride crucible.

After the first heat treatment step, a sizing step including operations in combination of crushing, grinding, and classifying a first heat-treated product resulting from the heat treatment, may be performed. Particles of a desired particle diameter may be obtained by the sizing step. Specifically, after roughly grinding a heat-treated product, the resulting heat-treated product may be ground using a common grinder, such as a ball mill, a jet mill, and a vibration mill to have a predetermined particle diameter. Excessive grinding, however, may cause defects on the surface of the fluorescent material particles, resulting in luminance decrease. When particles having different particle diameters are present after grinding, the particle diameters may be made uniform by classifying the particles. The final adjustment of the particle diameter may also be made after a third heat treatment step or acid-treatment step described later.

The mean particle diameter of the first heat-treated product may be, for instance, from 2 μm to 30 μm, and preferably from 4 μm to 20 μm.

In the second heat treatment step, a second mixture containing the first heat-treated product, an aluminum compound, a europium compound, and a second silicon oxynitride compound, which has a larger oxygen content than the first silicon oxynitride compound, is heat-treated to obtain a second heat-treated product. The aluminum compound and the europium compound in the second mixture are the same as the aluminum compound and the europium compound in the first heat treatment step, and preferable modes are also the same. Furthermore, at least a portion of the first heat-treated product in the second mixture may be replaced with a commercially available or separately prepared β-sialon fluorescent material.

The second silicon oxynitride compound in the second mixture is the same as the first silicon oxynitride compound except that the second silicon oxynitride compound has an oxygen content larger than the oxygen content in the first silicon oxynitride compound. The oxygen content in the second silicon oxynitride compound is, for instance, 0.8% by weight or more, and preferably 0.9% by weight or more. The content of the oxygen atom is, for instance, 2% by weight or less, and preferably 1.5% by weight or less.

The ratio ($C^2/C^1$) of the content of oxygen atom in the second silicon oxynitride compound ($C^2$) to the content of oxygen atom in the first silicon oxynitride compound ($C^1$) is, for instance, 1.5 or more, and preferably 1.8 or more. The ratio of the content of oxygen atom is, for instance, 7 or less, and preferably 4 or less. When the ratio of the oxygen content is within this range, a β-sialon fluorescent material having superior light emitting luminance is likely to be obtained.

The second mixture contains the first heat-treated product. It is believed that because the first heat-treated product in the second mixture serves, for instance, as a seed crystal, a β-sialon fluorescent material having a larger particle diameter and superior in crystallinity is formed in the second heat treatment step.

The content of the first heat-treated product in the second mixture is, for instance, 2% by weight or more, and preferably 5% by weight or more. The content of the first heat-treated product is also, for instance, 50% by weight or less, and preferably 30% by weight or less. When the content of the first heat-treated product is within this range, a β-sialon fluorescent material having superior light emitting luminance is likely to be obtained.

The mixing ratio of the aluminum compound, the europium compound, and the second silicon oxynitride compound in the second mixture may be the same as the mixing ratio in the first mixture. The second mixture may also contain a flux like the first mixture. The second mixture can be prepared in the same manner as the first mixture except that the first heat-treated product is further blended.

In the second heat treatment step, a second mixture is heat-treated to obtain a second heat-treated product. The temperature of the heat treatment in the second heat treatment step is preferably from 1850° C. to 2100° C., more preferably from 1850° C. to 2040° C., and still more preferably from 1850° C. to less than 2000° C. The temperature of the heat treatment in the second heat treatment step is also preferably lower than the temperature of the heat treatment in the first heat treatment step. The difference in temperature of the heat treatment between the first heat treatment step and the second heat treatment step is preferably 10° C. or more, and more preferably 20° C. or more. The difference in temperature is preferably 100° C. or less.

The modes of, for example, the atmosphere, the pressure, the time for elevating temperature, and the retention time in the heat treatment of the second heat treatment step are the same as the modes in the first heat treatment step.

Furthermore, a sizing step including operations in combination of crushing, grinding, and classifying a second heat-treated product resulting from the heat treatment may be performed after the second heat treatment step.

In the method for producing a β-sialon fluorescent material, the second heat treatment step may be performed more than once. That is, the mixture containing a second heat-treated product obtained in the second heat treatment step, an aluminum compound, a europium compound, and a second silicon oxynitride compound may be subjected to the same heat treatment step. The oxygen content in the second silicon oxynitride compound to be used in the second heat treatment step for the second time round and onward will suffice as long as the oxygen content is larger than the oxygen content in the first silicon oxynitride compound, and may be the same as the oxygen content in the second silicon oxynitride compound used in the second heat treatment step in the first round.

The method for producing a β-sialon fluorescent material may include, for example, a third heat treatment step of heat-treating a second heat-treated product in a rare gas atmosphere at 1300° C. to 1600° C., an acid-treatment step of acid-treating a heat-treated product obtained in the third heat treatment step, and a washing step, in addition to the first heat treatment step and the second heat treatment step.

Further including a third heat treatment step and an acid-treatment step may result in a β-sialon fluorescent material far superior in light emitting luminance and stability. This can be considered, for instance, as described below. That is, it is believed that since the temperature of the third heat treatment step is lower than the temperatures of the first and second heat treatment steps, an unstable phase and a low crystalline portion, for example, that are contained in the fluorescent material particles are thermally decomposed, resulting in more stable fluorescent material particles with high crystallinity. Furthermore, the thermolysis product generated in the third heat treatment may contain, for instance, simple silicon, and such a thermolysis product can be removed by the subsequent acid treatment.

In the third heat treatment step, the second heat-treated product is heat-treated in a rare gas atmosphere at a temperature of from 1300° C. to 1600° C., and preferably from 1350° C. to 1500° C. The rare gas atmosphere will suffice as long as it contains at least one rare gas, such as helium, neon, or argon, and may contain, for instance, oxygen, hydrogen, and nitrogen, in addition to the rare gas. The content of the rare gas in the rare gas atmosphere is, for instance, 95% by volume or more, and preferably 99% by volume or more.

Here, when the method for producing a β-sialon fluorescent material include the second heat treatment step more than once, the second heat-treated product refers to the second heat-treated product obtained in the final second heat treatment step.

The pressure in the third heat treatment step may be, for instance, in the range of from ordinary pressure to 1 MPa, and is preferably from ordinary pressure to 0.2 MPa.

The time for heat treatment in the third heat treatment step is, for instance, from 1 hour to 48 hours, and preferably 2 hours to 20 hours.

The third heat treatment step may include a step of, for instance, crushing and grinding the resultant heat-treated product. The crushing treatment, the grinding treatment, or the like can be performed by the previously described methods.

In the acid treatment step, a heat-treated product obtained in the third heat treatment step is acid-treated. The acid used in the acid treatment is preferably a mixed acid containing hydrofluoric acid and nitric acid. The mixed acid may further contain, for instance, hydrochloric acid in addition to hydrofluoric acid and nitric acid. The total content of hydrofluoric acid and nitric acid contained in the mixed acid is, for instance, 30% by weight or more, and preferably 50% by weight or more. Furthermore, the ratio by weight of hydrofluoric acid to nitric acid (hydrofluoric acid/nitric acid) in the mixed acid is, for instance, from 0.3 to 3.0, and preferably from 0.5 to 2.0.

The temperature, the time required, and so forth in the acid treatment step may be selected as appropriate depending on, for example, the components of the acid to be used in the treatment. The temperature of the acid treatment is, for instance, from 20° C. to 90° C., and preferably from 40° C. to 80° C. The time for the acid treatment is, for instance, from one minute to 24 hours, and preferably 5 minutes to 2 hours.

In the washing step, at least a portion of acid adhered during the acid treatment step may be removed. For washing, for instance, alcohol, such as ethanol, and water may be used. The washing step may include drying treatment after washing.

The β-sialon fluorescent material of the present embodiment is a β-sialon fluorescent material obtained by the production method of the present embodiment. The β-sialon fluorescent material of the present embodiment is superior in light emitting luminance and stability by being obtained by the specific production method.

The β-sialon fluorescent material according to the present embodiment absorbs light in the ultraviolet region to visible light in the short wavelength region, and has a peak light emission wavelength more on the long-wavelength side than the peak light emission wavelength of the excitation light. The visible light in the short wavelength region is mainly in the blue light region. Specifically, the β-sialon fluorescent material according to the present embodiment is excited by light from an excitation light source having a peak light emission wavelength in the wavelength range of from 250 nm to 480 nm, and emits fluorescence having a peak light emission wavelength in the wavelength range of from 520 nm to 560 nm. A fluorescent material having high light emission efficiency can be provided by using an excitation light source in this range. In particular, it is preferred that an excitation light source having a main peak light emission wavelength in the range of from 350 nm to 480 nm be used, and it is more preferred that an excitation light source having a peak light emission wavelength in the range of from 420 nm to 470 nm be used.

The β-sialon fluorescent material according to the present embodiment also has high crystallinity. For instance, since a glass body (amorphous) has a loose structure, the reaction conditions in the production steps of a fluorescent material must be controlled to be strictly uniform. Otherwise, the ratio of components in the resultant fluorescent material varies, causing chromaticity unevenness. In contrast, the β-sialon fluorescent material according to the present embodiment is not a glass body but a powder or a granule having high crystallinity, and thus can be easily produced and processed. In addition, the β-sialon fluorescent material according to the present embodiment can be uniformly dispersed, for example, in an organic medium, so that light emitting plastics and polymeric thin film materials, for example, can be readily prepared using the β-sialon fluorescent material according to the present embodiment. Specifically, the β-sialon fluorescent material according to the present embodiment has a crystalline phase of 50% by weight or more, preferably 80% by weight or more. This indicates the proportion of the crystalline phase having light emission properties, and a crystalline phase of 50% by weight or more ensures emission of light enough for practical use.

The mean particle diameter of the β-sialon fluorescent material according to the present embodiment is, for instance, from 4 μm to 30 μm, and preferably from 8 μm to 25 μm in terms of volume median diameter (Dm) measured using the Coulter principle. The mean particle diameter is also, for instance, from 11 μm to 25 μm. Preferably, the β-sialon fluorescent material contains particles of this mean particle diameter at high frequency. That is, the particle sizes are preferably distributed in a narrow range. A light emitting device including a β-sialon fluorescent material having a particle size distribution with a narrow half bandwidth has less color unevenness, and thus has favorable color tone. Furthermore, the larger the mean particle diameter, the higher the light absorption and the light emission efficiency. As described above, by incorporating a fluorescent material having a large mean particle diameter and optically superior characteristics in a light emitting device, the light emission efficiency of the light emitting device improves.

EXAMPLES

Hereinafter, the present invention will be specifically explained with reference to Examples. The present invention, however, is not limited to the following Examples as long as the gist of the invention is not deviated from.

Example 1

A first silicon oxynitride ($Si_3N_4$) and a second silicon oxynitride, which are material compounds, were prepared. The oxygen content in the first silicon oxynitride was 0.57% by weight, and the specific surface area obtained by the BET method was about 6.5 $m^2/g$. The oxygen content in the second silicon oxynitride was 1.16% by weight, and the specific surface area obtained by the BET method was about 10 $m^2/g$.

The first silicon oxynitride, aluminum nitride (AlN), and europium oxide ($Eu_2O_3$) were weighed so that the molar ratio of Si:Al:Eu=5.88:0.12:0.01 was satisfied, and were mixed to have a material mixture, which is a first mixture. The material mixture was filled into a boron nitride crucible, and was subjected to a first heat treatment under the conditions of: a nitrogen atmosphere, a pressure of about 0.92 MPa (gauge pressure), a first heat treatment temperature of 2040° C., and a heat treatment time of 10 hours, to obtain a first heat-treated product.

The resultant first heat-treated product, the second silicon oxynitride, aluminum nitride, and europium oxide, which are the same as the aluminum nitride and europium oxide used in the first heat treatment, were mixed to obtain a second mixture. The content of the first heat-treated product in a second mixture was 10% by weight, and the ratio of Si:Al:Eu was adjusted to be the same as the ratio in the first heat treatment.

The second mixture was subjected to a second heat treatment, as a material mixture, under the conditions of: a nitrogen atmosphere, a pressure of about 0.92 MPa, a second heat treatment temperature of 1970° C., and a heat treatment time of 10 hours, to obtain a second heat-treated product.

The resultant second heat-treated product was roughly ground in a mortar, and then subjected to a third heat treatment under the conditions of: at 1400° C. for 5 hours under ordinary pressure in an argon atmosphere. Subsequently, dispersion and classifying treatments were carried out. The resultant particles were poured into a mixed acid of 46%HF:60%$HNO_3$=1:1 ratio by weight, and stirred for 30 minutes at an acid treatment temperature of 70° C., and then washed and dried to obtain a β-sialon fluorescent material of Example 1 (hereinafter referred to as "β-sialon fluorescent material 1").

Comparative Example 1

β-sialon fluorescent material of Comparative Example 1 (hereinafter referred to as "β-sialon fluorescent material C1") was prepared under the same conditions as those in Example 1 except that silicon oxynitride having an oxygen content of 0.57% by weight was used in place of the second silicon oxynitride having an oxygen content of 1.16% by weight. Comparative Example 2

β-sialon fluorescent material of Comparative Example 2 (hereinafter referred to as "β-sialon fluorescent material C2") was prepared under the same conditions as those in Example 1 except that silicon oxynitride having an oxygen content of 1.16% by weight was used in place of the first silicon oxynitride having an oxygen content of 0.57% by weight.

Example 2

β-sialon fluorescent material of Example 2 (hereinafter referred to as "β-sialon fluorescent material 2") was prepared under the same conditions as those in Example 1 except that a second silicon oxynitride having an oxygen content of 1.09% by weight was used in place of the second silicon oxynitride having an oxygen content of 1.16% by weight.

<Evaluation>

For each silicon oxynitride, the oxygen content was obtained using an oxygen/nitrogen (ON) analyzer (EMIA) manufactured by HORIBA, Ltd. Further, for each of Examples and Comparative Examples, the ratio of the oxygen content in the second silicon oxynitride compound to the oxygen content in the first silicon oxynitride compound (oxygen content ratio) was calculated.

For each of the resultant fluorescent material particles, the mean particle diameter (Dm, median diameter) was measured using a particle-size distribution measuring device (Multisizer manufactured by Beckman Coulter) by the pore electrical resistance method (Electrical sensing zone method) based on the Coulter principle.

The light emission properties of the fluorescent materials were measured by a fluorescence spectrophotometer: F-4500 (manufactured by Hitachi High-Technologies Corporation). Specifically, the wavelength of the excitation light was set to 460 nm, and the light emission spectra were measured, and then the peak intensity ratio (%) and peak light emission wavelengths (nm) of the resultant respective light emission spectra were obtained. Here, the intensity ratio of the peak was calculated using Comparative Example 2 as a criterion. The results are shown in Table 1 below.

TABLE 1

| | Oxygen content (wt %) | | | | |
| --- | --- | --- | --- | --- | --- |
| | First silicon oxynitride | Second silicon oxynitride | Oxygen content ratio | Mean particle diameter (mm) | Intensity ratio (%) |
| Example 1 | 0.57 | 1.16 | 2.04 | 13.9 | 122 |
| Comparative Example 1 | 0.57 | 0.57 | 1 | 10.9 | 87 |
| Comparative Example 2 | 1.16 | 1.16 | 1 | 7.7 | 100 |
| Example 2 | 0.57 | 1.09 | 1.91 | 13.2 | 120 |

Figure 1:
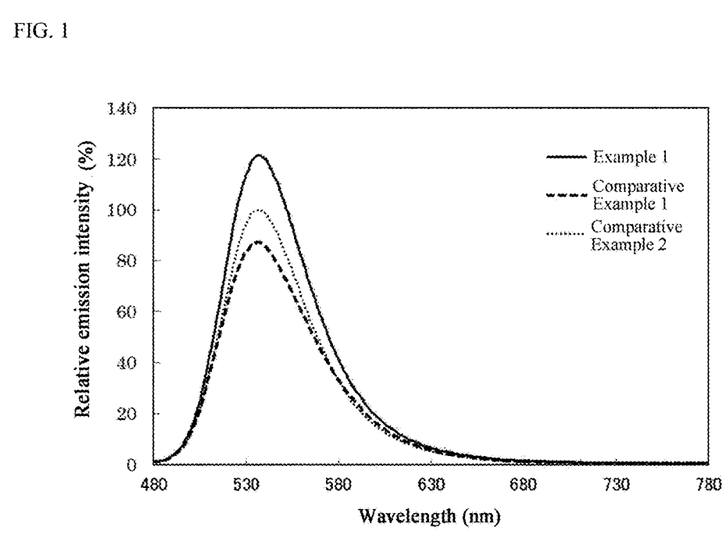
FIG. 1 is a graph showing a light emission spectrum of a β-sialon fluorescent material according to the present embodiment.

The light emission spectra of β-sialon fluorescent material 1, and β-sialon fluorescent materials C1 and C2 respectively obtained in Example 1 and Comparative Examples 1 and 2 were normalized to the maximum light emission intensity of β-sialon fluorescent material C2 of Comparative Example 2 and are shown in FIG. 1. As shown in FIG. 1, the relative emission intensity of β-sialon fluorescent material 1 of Example 1 is greater, in particular, in peak light emission wavelength, than the relative emission intensities of β-sialon fluorescent materials C1 and C2 respectively obtained in Comparative Examples 1 and 2. Furthermore, as shown in Table 1, the emission intensities of β-sialon fluorescent materials 1 and 2 of Examples 1 and 2 are greater than the emission intensities of β-sialon fluorescent materials C1 and C2 respectively obtained in Comparative Examples 1 and 2. These indicate that the production method of the present Examples resulted in β-sialon fluorescent materials with higher luminance. It is also shown that Example 1 has a higher oxygen content ratio than Example 2; that β-sialon fluorescent material 1 has a greater mean particle diameter than β-sialon fluorescent material 2; and that β-sialon fluorescent material 1 has greater light emission intensity than β-sialon fluorescent material 2. β-sialon fluorescent materials 1, 2, C1, and C2 all had a peak light emission wavelength at 537 nm.

Figure 2:
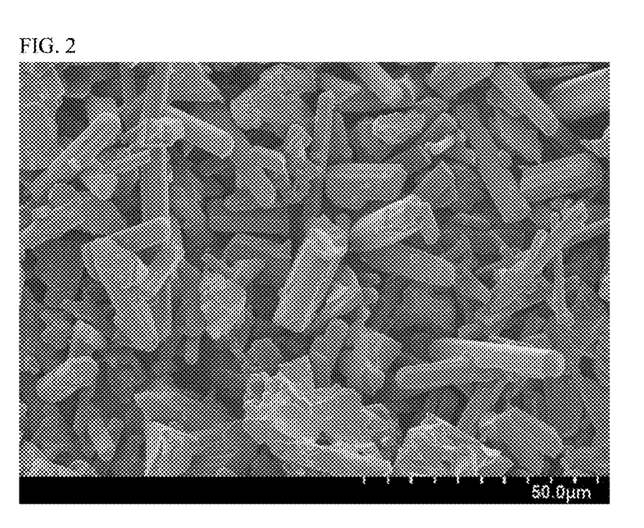
FIG. 2 is a view showing an example of a scanning electron microscope (SEM) image of a β-sialon fluorescent material according to Example 1.
Figure 3:
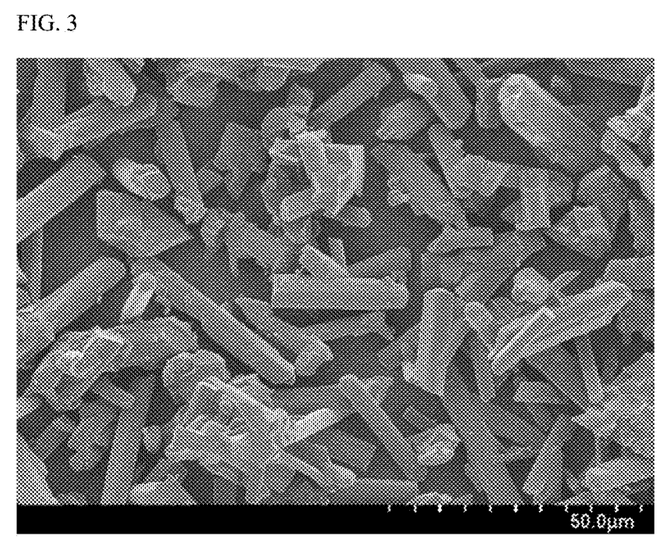
FIG. 3 is a view showing an example of an SEM image of a β-sialon fluorescent material according to Example 2.
Figure 4:
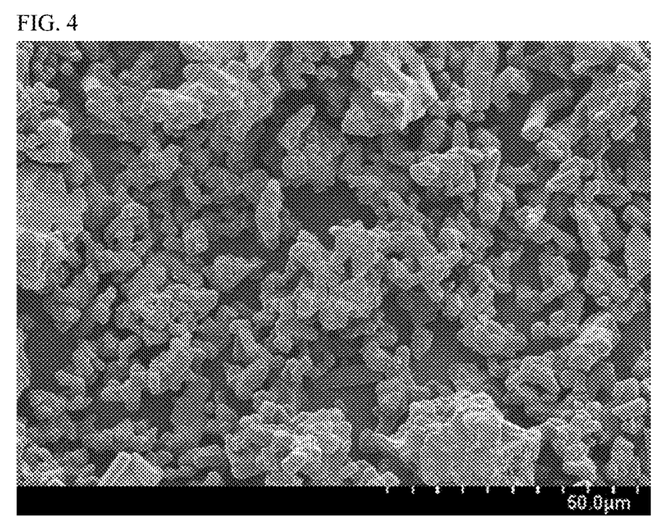
FIG. 4 is a view showing an example of an SEM image of a β-sialon fluorescent material according to Comparative Example 1.
Figure 5:
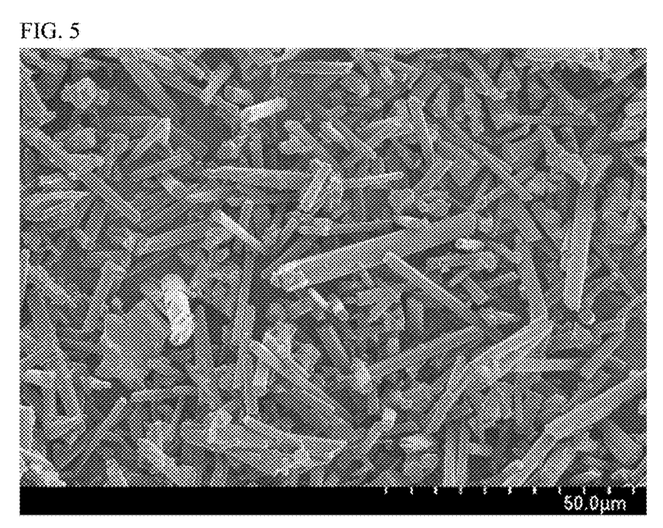
FIG. 5 is a view showing an example of an SEM image of a β-sialon fluorescent material according to Comparative Example 2.

Scanning electron microscope (SEM) images showing the particle shapes of β-sialon fluorescent materials 1 and 2 and C1 and C2 respectively obtained in Examples 1 and 2 and Comparative Example 1 and 2 are shown in FIGS. 2 to 5. As shown in FIGS. 2 and 3, the particles of β-sialon fluorescent materials 1 and 2 respectively obtained in Examples 1 and 2 have a large, uniform shape. In contrast, as shown in FIG. 4, the particles of β-sialon fluorescent material C1 obtained in Comparative Example 1 are in the form of aggregates of small particles, and as shown in FIG. 5, the particles of β-sialon fluorescent material C2 obtained in Comparative Example 2 are each in the form of a long, slender bar. These differences in particle shape also appear in the values of mean particle diameters shown in Table 1, where the particles of β-sialon fluorescent materials 1 and 2 respectively obtained in Examples 1 and 2 have a larger mean particle diameter than the particles of β-sialon fluorescent materials C1 and C2 respectively obtained in Comparative Examples 1 and 2.

It is believed that the oxygen content in silicon oxynitride of the materials, which is a factor that makes a difference in properties between Examples and Comparative Examples, largely affect particle growth and particle shape. Specifically, the larger the oxygen content, the particles are more likely to grow into the form of a long, slender bar, resulting in fluorescent materials of insufficient light emission intensity. When the oxygen content in silicon oxynitride is small, it is believed that the particle growth is unlikely to proceed.

In the present disclosure, silicon oxynitride having a smaller oxygen content is used in the first heat treatment to obtain a first heat-treated product, which is not a long, slender bar-shape, and the first heat-treated product is then subjected to a second heat treatment together with silicon oxynitride having a larger oxygen content. That is, a first heat-treated product, which is shape-controlled in the first heat treatment, is combined with silicon oxynitride that is prone to particle growth, and then subjected to the second heat treatment. This is believed to help increase crystallinity, resulting in β-sialon fluorescent materials having a large particle shape and high luminance.

The β-sialon fluorescent material obtained by the production method of the present embodiment can achieve high luminance. A light emitting device incorporating the β-sialon fluorescent material may be suitably used, for example, as a light source for backlights for liquid crystal displays, and a light source for lighting.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

All publications, patent applications, and technical standards mentioned in this specification are herein incorporated by reference to the same extent as if each individual publication, patent application, or technical standard was specifically and individually indicated to be incorporated by reference.

What is claimed is:

1. A method for producing a β-sialon fluorescent material, the method comprising:

heat-treating in a nitrogen-containing atmosphere a first mixture containing an aluminium compound, a europium compound, and a first silicon oxynitride compound to obtain a first heat-treated product; and heat-treating in a nitrogen-containing atmosphere a second mixture containing the first heat-treated product, an aluminium compound, a europium compound, and a second silicon oxynitride compound, which has an oxygen content larger than an oxygen content in the first silicon oxynitride compound, to obtain a second heat-treated product, wherein the first heat-treated product contains an intermediate β-sialon fluorescent material, and wherein the β-sialon fluorescent material has a composition represented by the following formula:

$Si_{6-z}Al_zO_zN_{8-z}:Eu$ wherein z satisfies $0.0 < z \leq 4.2$.

2. The method according to claim 1, wherein a ratio of the oxygen content in the second silicon oxynitride compound to the oxygen content in the first silicon oxynitride compound is not less than 1.5.

3. The method according to claim 1, wherein the first silicon oxynitride compound has an oxygen content of from 0.3% by weight to less than 0.8% by weight, and the second silicon oxynitride compound has an oxygen content of from 0.8% by weight to 2.0% by weight.

4. The method according to claim 1, wherein the oxygen content in the first silicon oxynitride compound is from 0.4% by weight to 0.7% by weight, and the oxygen content in the second silicon oxynitride compound is from 0.9% by weight to 1.5% by weight.

5. The method according to claim 1, wherein the second mixture has a content of from 2% by weight to 50% by weight of the first heat-treated product.

6. The method according to claim 1, further comprising heat-treating the second heat-treated product in a rare gas atmosphere, and then acid-treating the resultant product.

7. The method according to claim 6, wherein the acid-treating comprises treating with a mixed acid containing hydrofluoric acid and nitric acid.

8. The method according to claim 6, wherein the heat-treating in the rare gas atmosphere is carried out at a temperature of from 1300° C. to 1600° C.

9. The method according to claim 1, wherein the heat-treating of the first mixture or the second mixture is carried out at a temperature of from 1850° C. to 2100° C.

10. The method according to claim 1, wherein the second mixture is heat-treated at a lower temperature than the heat-treating of the first mixture.

* * * * *